(12) United States Patent
Hamada et al.

(10) Patent No.: US 7,618,740 B2
(45) Date of Patent: Nov. 17, 2009

(54) COOLING DEVICE FOR BATTERY PACK AND RECHARGEABLE BATTERY

(75) Inventors: Shinji Hamada, Toyohashi (JP); Toyohiko Eto, Toyota (JP)

(73) Assignees: Toyota Jidosha Kabushiki Kaisha, Aichi (JP); Panasonic Corporation, Osaka (JP)

( * ) Notice: Subject to any disclaimer, the term of this patent is extended or adjusted under 35 U.S.C. 154(b) by 470 days.

(21) Appl. No.: 11/522,412

(22) Filed: Sep. 18, 2006

(65) Prior Publication Data

US 2007/0015049 A1    Jan. 18, 2007

Related U.S. Application Data

(63) Continuation of application No. 10/435,194, filed on May 12, 2003, now Pat. No. 7,150,935.

(30) Foreign Application Priority Data

May 13, 2002  (JP) .............................. 2002-136611
Feb. 26, 2003  (JP) .............................. 2003-049553

(51) Int. Cl.
  *H01M 10/50*  (2006.01)
  *H01M 2/12*   (2006.01)
(52) U.S. Cl. ........................................ 429/120; 429/71
(58) Field of Classification Search ................. 419/120, 419/149, 62, 71; 320/150
  See application file for complete search history.

(56) References Cited

U.S. PATENT DOCUMENTS 5,212,024 A    5/1993   Klink et al.

| 6,094,927 | A  | 8/2000  | Anazawa et al. |
| 6,444,353 | B1 | 9/2002  | Takaki et al. |
| 6,498,406 | B1 | 12/2002 | Roriuchi et al. |
| 6,517,966 | B1 | 2/2003  | Marukawa et al. |
| 6,569,561 | B1 | 5/2003  | Kimura et al. |
| 6,819,085 | B2 | 11/2004 | Kimoto |

(Continued)

FOREIGN PATENT DOCUMENTS

EP        1089373        4/2001

(Continued)

OTHER PUBLICATIONS

English language Abstract and partial translation of JP 7-192774 A, Jul. 28, 1995.

(Continued)

*Primary Examiner*—Patrick Ryan
*Assistant Examiner*—Thomas H. Parsons
(74) *Attorney, Agent, or Firm*—Greenblum & Bernstein, P.L.C.

(57) ABSTRACT

In a battery pack including rechargeable batteries arranged in parallel, a cooling medium path for allowing a cooling medium to horizontally flow be formed between the rechargeable batteries. A cooling medium delivery device for delivering the cooling medium to the cooling medium path is provided so as to reduce a height of the battery pack including a cooling device. The cooling medium delivery device is constituted by a pair of cooling medium introduction ducts provided on both right and left sides of the battery pack, each having delivery ports for delivering the cooling medium alternately in horizontally opposed directions to each of the cooling medium paths, and a cooling medium compression transport device for supplying the cooling medium to both of the cooling medium introduction ducts.

3 Claims, 8 Drawing Sheets

U.S. PATENT DOCUMENTS

| | | | |
|---|---|---|---|
| 7,291,421 | B2 | 11/2007 | Kimura et al. |
| 2001/0026886 | A1 | 10/2001 | Inui et al. |

FOREIGN PATENT DOCUMENTS

| | | |
|---|---|---|
| JP | 5-169981 | 7/1993 |
| JP | 5-190213 A | 7/1993 |
| JP | 7-192774 A | 7/1995 |
| JP | 8-241702 A | 9/1996 |
| JP | 9-199186 A | 7/1997 |
| JP | 10-106637 | 4/1998 |
| JP | 11-086915 | 3/1999 |
| JP | 11-180168 A | 7/1999 |
| JP | 2000-200592 A | 7/2000 |
| JP | 2000-223099 | 8/2000 |
| JP | 2000-251952 A | 9/2000 |
| JP | 2000-280759 | 10/2000 |
| JP | 2001-105894 A | 4/2001 |
| JP | 2001-167803 | 6/2001 |
| JP | 2001-167806 A | 6/2001 |
| JP | 2001-176472 A | 6/2001 |
| JP | 2001-229897 A | 8/2001 |
| JP | 2002-042753 A | 2/2002 |
| JP | 2003-331932 A | 11/2003 |
| WO | 98/31059 | 7/1998 |

OTHER PUBLICATIONS

English language Abstract of JP 2001-105894 A, Apr. 17, 2001.
English language Abstract of JP 2002-042753 A, Feb. 8, 2002.
English language Abstract of JP 2000-251952 A, Sep. 14, 2000.
English language Abstract of JP 8-241702 A, Sep. 17, 1996.
English language Abstract of JP 11-180168 A, Jul. 6, 1999.
English language Abstract of JP 2001-167806 A, Jun. 22, 2001.
English language Abstract of JP 5-190213 A, Jul. 30, 1993.
English language Abstract of JP 2001-229897 A, Aug. 24, 2001.
English language Abstract of JP 9-199186 A, Jul. 31, 1997.
English language Abstract of JP 2000-200592 A, Jul. 18, 2000.
English language Abstract of JP 2001-176472 A, Jun. 29, 2001.
English language Abstract of JP 2003-331932 A, Nov. 21, 2003.
English Language Abstract of JP 2000-280759, Oct. 10, 2000.
English Language Abstract of JP 2000-223099, Aug. 11, 2000.
English Language Abstract of JP 11-086915, Mar. 30, 1999.
English Language Abstract of JP 5-169981, Jul. 9, 1993.
English Language Abstract of JP 2001-167803, Jul. 16, 1998.

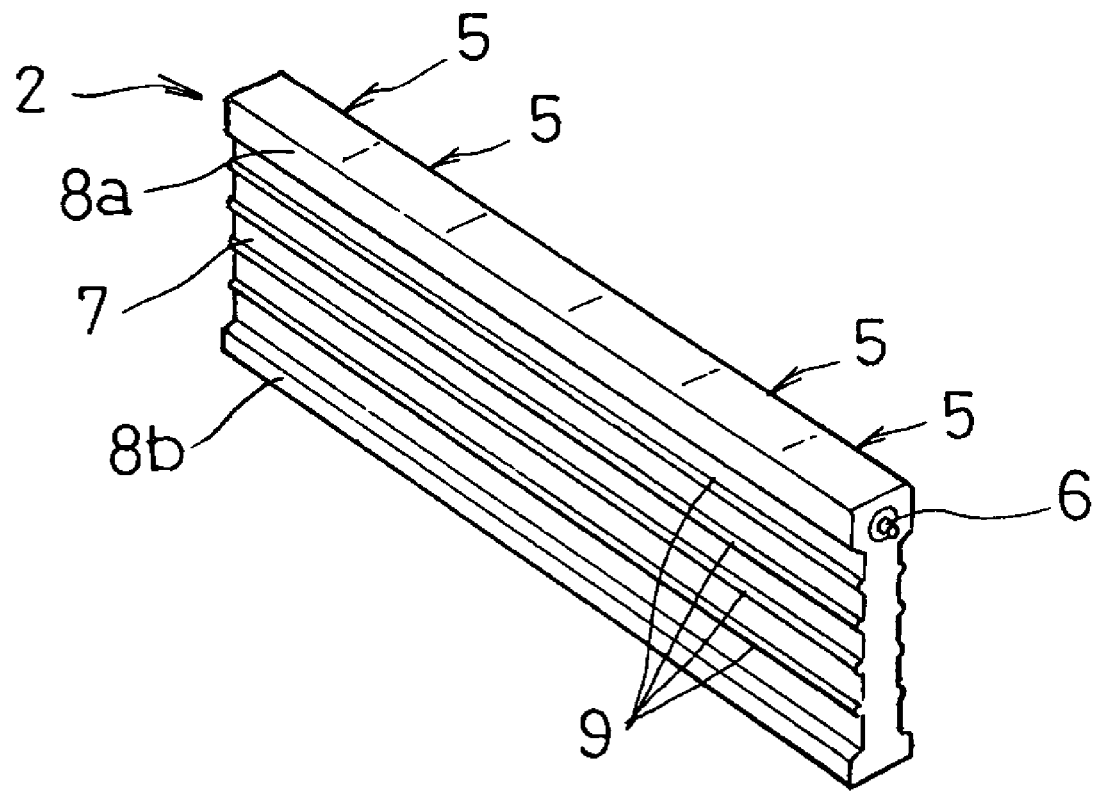
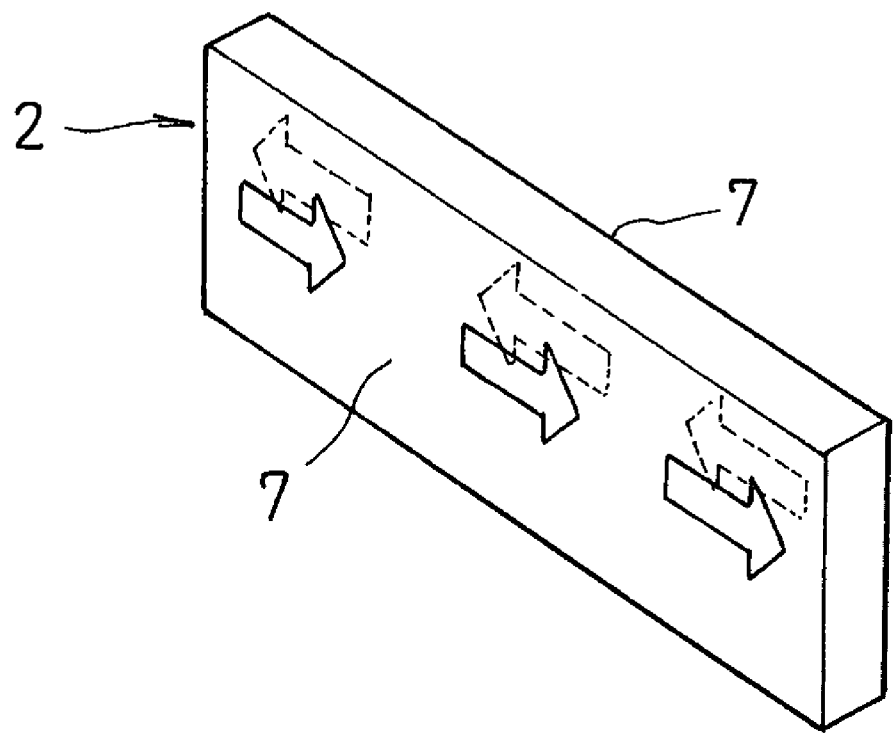
Fig. 3

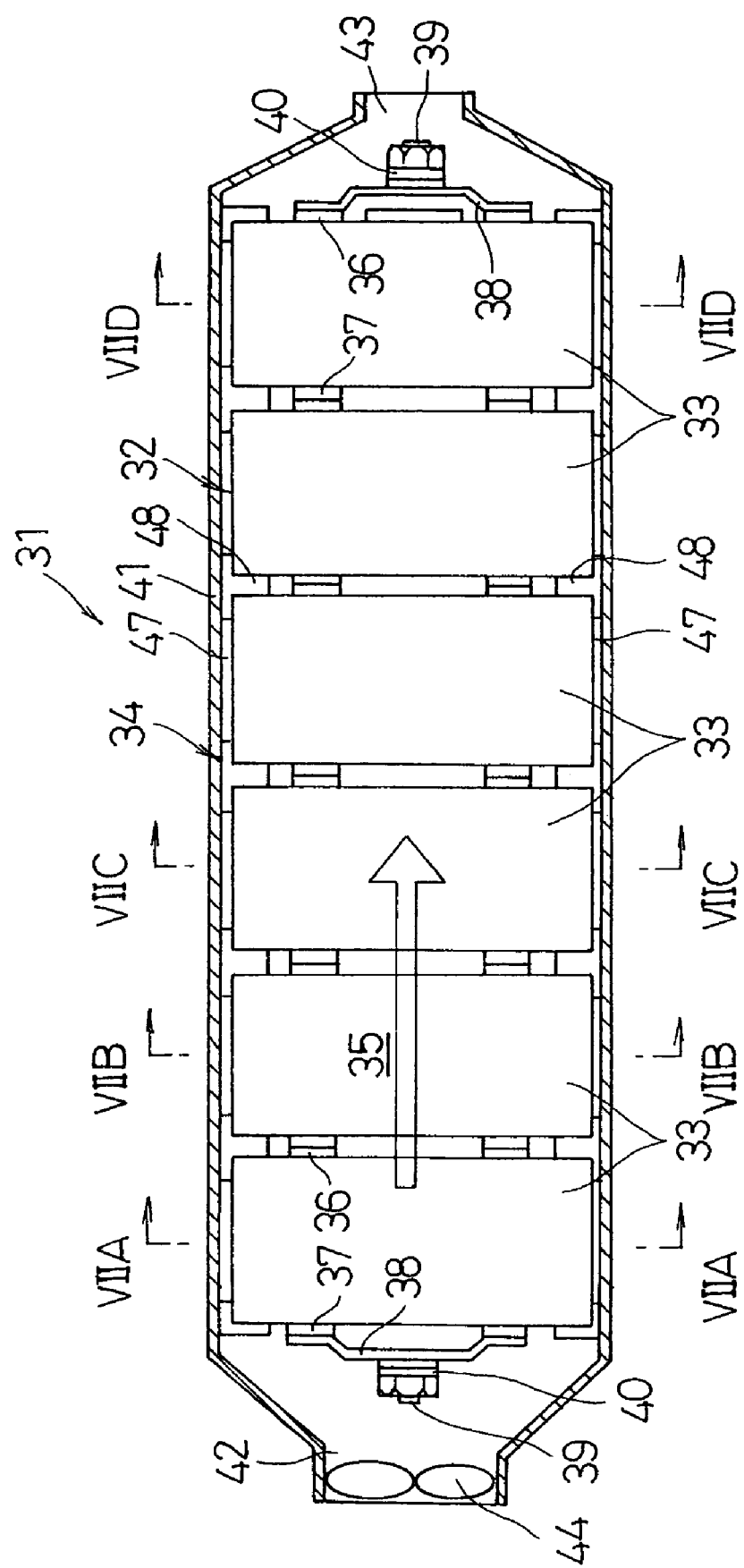

COOLING DEVICE FOR BATTERY PACK AND RECHARGEABLE BATTERY

CROSS REFERENCES TO RELATED APPLICATIONS

This application is a continuation of U.S. patent application Ser. No. 10/435,194, filed May 12, 2003, (now U.S. Pat. No. 7,150,935) the entire content of which is herein incorporated by reference in its entirety. The present disclosure also relates to subject matter contained in priority Japanese Patent Application Nos. 2002-136611 and 2003-49553, filed on May 13, 2002 and Feb. 26, 2003, respectively, the content of which is herein expressly incorporated by reference in its entirety.

BACKGROUND OF THE INVENTION

1. Field of the Invention

The present invention relates to a cooling device for a battery pack including a plurality of prismatic rechargeable batteries arranged in parallel and to such a rechargeable battery.

2. Description of Related Art

In a conventional battery pack, in order to prevent decrease in a battery output, charging/discharging efficiency, and battery service life due to the elevation of the battery temperature by heat generation that occurs along with charging/discharging, for example, Japanese Patent Laid-Open Publication No. 2001-167803 discloses a fan provided to upwardly send cooling air between cells included in the battery pack or between battery modules, each including a plurality of serially connected cells.

An example of this type of cooling device for a battery pack will be described with reference to FIGS. 9 and 10. In FIG. 9, the reference numeral 51 denotes a battery pack serving as a driving power source for electric vehicles including hybrid cars. The battery pack 51 includes ten to thirty rechargeable batteries 52 that are arranged in parallel with ventilation spaces 54 being provided in a vertical direction between the rechargeable batteries 52. The rechargeable batteries 52 are interposed between a pair of end plates 55 provided on both ends in a parallel direction with a binding band 56. The rechargeable batteries 52 are integrally fixed in this manner to constitute the battery pack 51.

As shown in FIG. 10, each of the rechargeable batteries 52 is constituted as a battery module including a plurality of cells 53 that are arranged in parallel in an integrated manner and connected in series. Each of the cells 53 is constituted by housing an electrode plate group and an electrolyte solution in a battery case. Connection terminals 57 provided on both ends of the rechargeable batteries 52 in a protruding manner are sequentially connected in series so as to obtain a predetermined output voltage of the battery pack 51. Moreover, on both side walls 58 of the rechargeable battery 52, longitudinal ribs 59 are provided between the cells 53 and on both ends of the rechargeable battery 52. When the rechargeable batteries 52 are arranged in parallel so that the both side walls 58 are opposed to each other, the longitudinal ribs 59 abut on each other to form the ventilation spaces 54 between both side walls 58.

The under face of the battery pack 51 is covered with a lower hood 61 with an air blowing space 60 being provided therebetween, whereas the upper face of the battery pack 51 is covered with an upper hood 63 with an air exhausting space 62 being provided therebetween. An air duct 66 extending from a blower fan 65 is connected to an air inlet port 64 provided on one end of the lower hood 61, whereas an air exhausting duct 68 is connected to an air exhausting port 67 provided on one end of the upper hood 63.

In the above-described cooling device for a battery pack, air in a vehicle compartment is sent by the blower fan 65 to the air blowing space 60 below the battery pack 51. In this manner, cooling air flows upwardly from below through the ventilation spaces 54 between the rechargeable batteries 52 to be exhausted into the air exhausting space 62, thereby allowing each of the rechargeable batteries 52 included in the battery pack 51 to be cooled. However, for such cooling, a space is required for forming the air blowing space 60 and the air exhausting space 62 below and above the battery pack 51. Since a large space is necessitated in a vertical direction for placing the battery pack 51, the position where the battery pack 51 is placed is restrained in a case where the battery pack 51 is to be used as a driving power source for vehicles.

In order to ensure a space for placing the driving power source for vehicles therein without any difficulty to increase the degree of freedom for a layout, a height of the battery pack 51 including the cooling device must be reduced.

SUMMARY OF THE INVENTION

In light of the above-mentioned conventional problem, the present invention has an object of providing a cooling device for a battery pack and a rechargeable battery, which reduces a height of the battery pack including the cooling device and efficiently and uniformly cools an individual rechargeable battery.

In a battery pack including a plurality of prismatic rechargeable batteries arranged in parallel so that their longer side faces are opposed to each other, each of the rechargeable batteries having a height larger than a thickness and the longer side faces with a width in a horizontal direction larger than the height, a cooling device for the battery pack according to a first aspect of the present invention includes: a cooling medium path for allowing a cooling medium to flow in right and left directions between the longer side faces of the rechargeable batteries; and a cooling medium delivery device for delivering the cooling medium to the cooling medium path. The cooling medium is made to flow through the cooling medium path between the longer side faces of the rechargeable battery, which have the largest area, from horizontal directions of the battery pack, so that each of the rechargeable batteries is effectively cooled. Since it is not necessary to provide the cooling medium delivery device above and below the battery pack, the height of the battery pack including the cooling device is reduced. In a case where, for example, the battery pack is mounted as a driving power source for vehicles, a space where the battery pack is placed is ensured without any difficulty.

A cooling device for a battery pack according to a second aspect of the invention, the battery pack including a plurality of rechargeable batteries arranged in parallel, includes: a plurality of cooling medium paths formed in a horizontal direction for allowing a cooling medium to flow between the rechargeable batteries; and a cooling medium delivery device for delivering a cooling medium to the cooling medium paths, wherein the cooling medium delivery device includes: a pair of cooling medium introduction ducts having delivery ports formed in such a manner that the cooling medium is delivered alternately in horizontally opposed directions to each of the cooling medium paths; and a cooling medium compression transport device for supplying the cooling medium to both the cooling medium introduction ducts. The cooling medium compression transport device is operated to allow the cooling medium to be delivered alternately in horizontally opposed directions to each of the cooling medium paths in the battery pack through the cooling medium introduction ducts. Since both side faces of each of the rechargeable batteries are cooled with the cooling medium flowing in the opposed directions, the cooling capacity is averaged between both side walls even if a temperature is increased while the cooling medium is passing through the cooling medium paths to decrease the cooling capacity. Thus, the rechargeable batteries are uniformly cooled over the overall horizontal length. Thereby, a decrease in a battery output, charging/discharging efficiency, and battery service life are prevented.

A cooling device for a battery pack according to a third aspect of the invention, the battery pack including a plurality of prismatic rechargeable batteries arranged in parallel, includes: a cooling medium path formed between the rechargeable batteries, for allowing a cooling medium to flow in a horizontal direction; and a cooling medium delivery device for delivering the cooling medium to the cooling medium path, wherein the cooling medium delivery device includes: a pair of cooling medium delivery hoods provided on both right and left sides of the battery pack, for delivering the cooling medium from any of right and left directions to each of the cooling medium paths; a cooling medium compression transport device connected to at least one of the cooling medium delivery hoods, capable of reversal switching a compression transport direction of the cooling medium; temperature detection members for detecting temperatures of vicinities of both horizontal ends of an arbitrary rechargeable battery; and a control device for controlling the cooling medium compression transport device for switching the compression transport direction of the cooling medium in accordance with the detected temperatures. The cooling medium compression transport device is operated to allow the cooling medium to flow from one of the cooling medium delivery hoods through each of the cooling medium paths to the other cooling medium delivery hood, thereby cooling the rechargeable batteries. Even if a temperature at one end of the rechargeable battery is reduced, a temperature at the other end may not be sufficiently lowered. When it is detected, that a difference in temperature between the ends of the battery is a predetermined value or higher, a compression transport direction of the cooling medium compression transport device is switched to allow the cooling medium to flow from the other cooling medium delivery hood through each of the cooling medium paths to the one of the cooling medium delivery hoods. By repeating this operation, the rechargeable batteries are uniformly cooled throughout the overall horizontal length. Thereby, a decrease in a battery output, charging/ discharging efficiency, and battery service life are prevented.

Furthermore, a cooling device for a battery pack according to a fourth aspect of the invention, the battery pack including a plurality of rechargeable batteries arranged in parallel, each of the rechargeable batteries being constituted by arranging and combining a plurality of prismatic cells in a row, includes: a spacer for forming a cooling medium path for allowing a cooling medium to flow in an arrangement direction of the cells, interposed between the rechargeable batteries so that an area of surfaces of the cells facing the cooling medium path is sequentially increased from an upstream side of flow of the cooling medium toward a downstream side. The area of the surfaces of the cells facing the cooling medium path is small on the upstream side where a temperature of the cooling medium is low, whereas the area of the surfaces of the cells facing the cooling medium path is large on the downstream side where a temperature of the cooling medium is elevated. Thus, each of the cells included in the rechargeable battery are uniformly cooled, thereby preventing a decrease in a battery output, charging/discharging efficiency, and battery service life.

A rechargeable battery according to the present invention includes an electricity generating element housed within a sealed prismatic battery case, wherein an upper rib and a lower rib are provided at two or four upper and lower positions among four positions at upper ends and lower ends on both side walls of the battery case so that the upper rib and the lower rib form a path having closed upper and lower ends and open left and right ends between the side walls when the rechargeable batteries are arranged in parallel with their side walls being opposed to each other. When the rechargeable batteries are arranged in parallel, the path having closed upper and lower ends and open left and right ends is formed between the side walls of the batteries. The cooling medium is allowed to flow through the thus formed path without providing the cooling medium delivery device above or below the rechargeable battery. Thereby, the rechargeable battery is effectively cooled in a horizontally compact structure.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 2 is a perspective view of a rechargeable battery in the embodiment;

FIG. 3 is a perspective view showing a flow direction of a cooling medium in each of the rechargeable batteries in the embodiment;

FIG. 6 is a longitudinal sectional front view showing a cooling device for a battery pack according to a third embodiment of the invention;

DETAILED DESCRIPTION OF THE PREFERRED EMBODIMENTS

First Embodiment

A first embodiment of a cooling device for a battery pack and a rechargeable battery constituting the battery pack according to the present invention will be described with reference to FIGS. 1 to 4.

Figure 1:
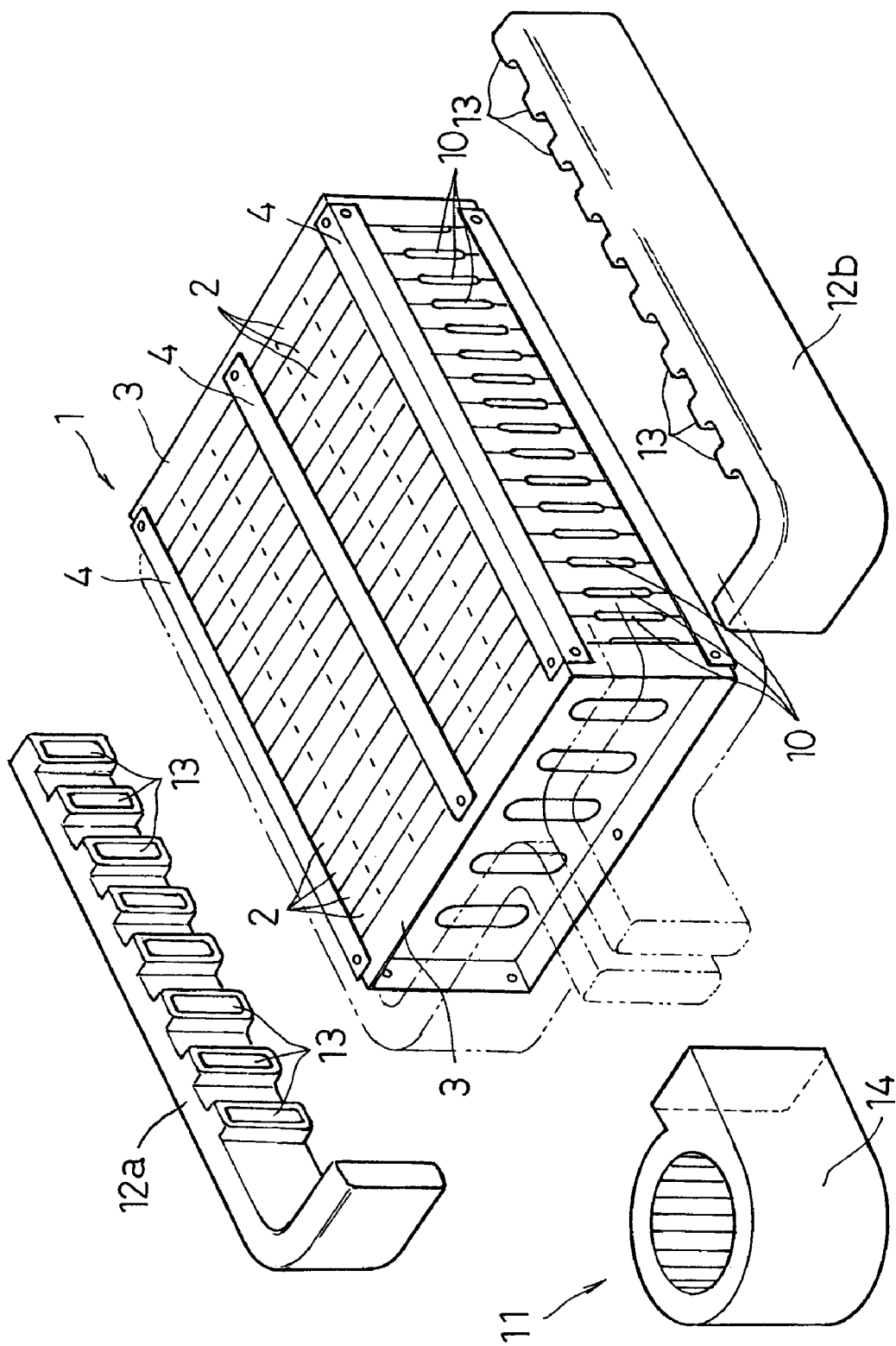
FIG. 1 is an exploded perspective view showing a schematic configuration of a cooling device for a battery pack according to a first embodiment of the present invention.
Figure 4:
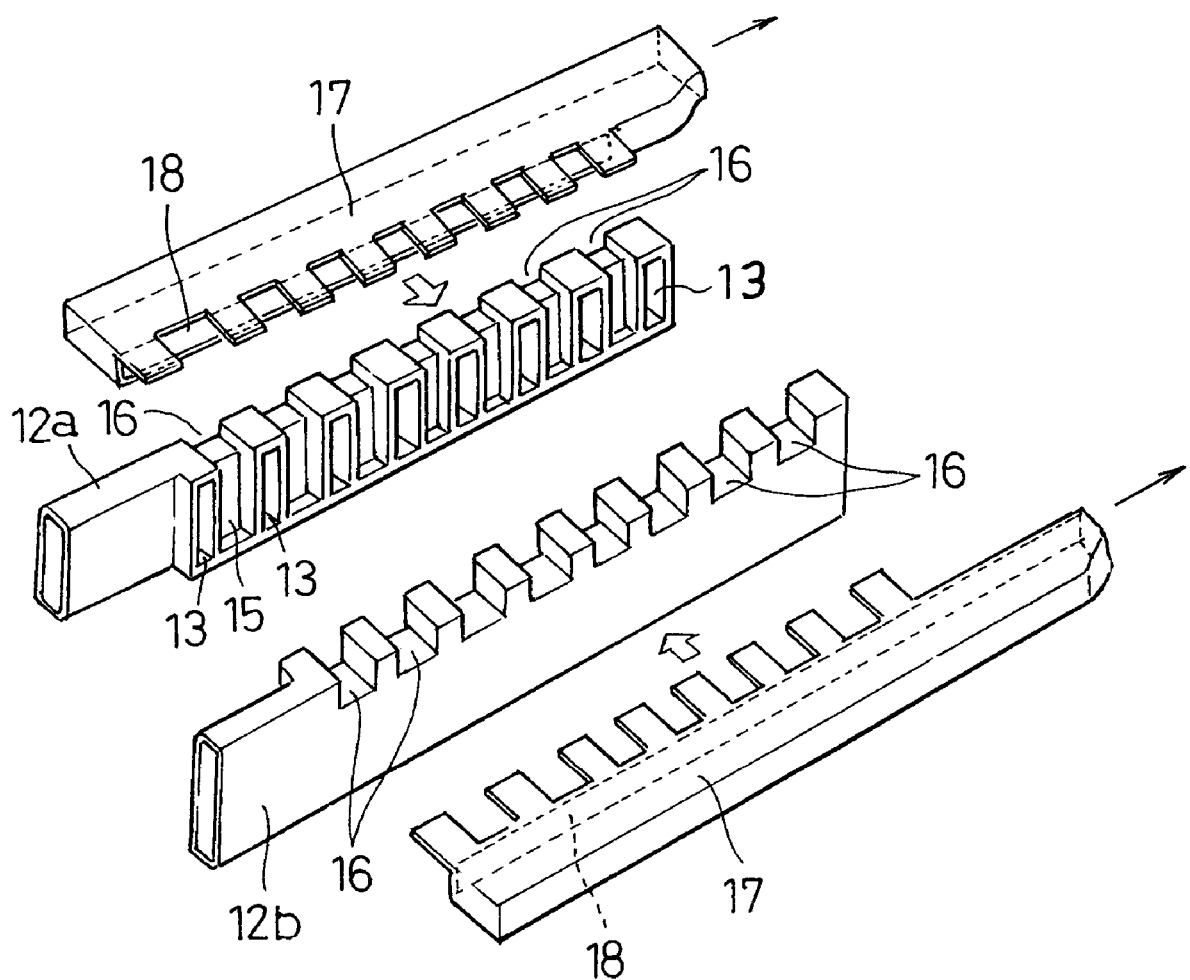
FIG. 4 is an exploded perspective view showing a cooling medium introduction duct and an air exhausting duct in a variation of the first embodiment.

In FIG. 1, reference numeral 1 denotes a battery pack serving as a driving power source for electric vehicles including hybrid cars. The battery pack 1 includes ten to thirty rechargeable batteries 2 that are arranged in parallel. The rechargeable batteries 2 are interposed between a pair of end plates 3 provided on both ends of the rechargeable batteries 2 in a parallel direction so as to be integrally fixed with a binding member 4, thereby constituting the battery pack 1.

Each of the rechargeable batteries 2 has a flat prismatic form with a height larger than a thickness. A longer side face of the rechargeable battery 2 has a horizontal width larger than the height. The rechargeable battery 2 is constituted as a battery module including a plurality of (in the illustrated example, six) cells 5 which are arranged and combined in parallel and are internally connected in series. Each of the cells 5 is constituted by housing an electricity generating element including an electrode plate group and an electrolyte solution within a battery case. Connection terminals 6 provided on both ends of the respective rechargeable batteries 2 are sequentially connected in series, thereby obtaining a predetermined output voltage of the battery pack 1.

Upper ribs 8a and lower ribs 8b are provided at the upper ends and the lower ends on both side walls 7 over its overall length, each side wall 7 constituting a longer side face of each of the rechargeable batteries 2. As shown in FIG. 1, when the rechargeable batteries 2 are arranged in parallel so that their side walls 7 are opposed to each other, cooling medium paths 10, each having upper and lower ends closed by the upper rib 8a and the lower rib 8b and having open right and left ends, are formed between the side walls 7. It is not necessarily required to provide the upper ribs 8a and the lower ribs 8b at four positions, that is, at the upper parts and the lower parts of both side walls 7; alternatively, the upper rib 8a and the lower rib 8b may be provided at two positions, that is, at the upper part and the lower part of one of the side walls 7, or at the upper part of one of the side walls 7 and at the lower part of the other side wall 7.

Between the upper rib 8a and the lower rib 8b of the side wall 7, protruding portions 9 for preventing the side wall 7 from expanding to narrow the cooling medium path 10 are provided at appropriate intervals. The protruding portions 9 prevent the cooling medium path 10 from being narrowed so as to maintain the cooling effects even when an internal pressure of the rechargeable battery 2 is increased. A plurality of protruding ridges horizontally extending over its overall length are suitable as the protruding portions 9 because the distribution of a flow rate of a cooling medium flowing through the cooling medium paths 10 is evened. However, small cylindrical protruding portions can also be formed in a distributed manner as the protruding portions 9.

A cooling medium delivery device 11 for delivering cooling air taken from a vehicle compartment as a cooling medium from the left and right sides of the battery pack 1 toward the cooling medium paths 10 is provided. The cooling medium delivery device 11 includes a pair of cooling medium introduction ducts 12a and 12b on the left and right sides of the battery pack 1. Each of the cooling medium introduction ducts 12a and 12b has delivery ports 13 for delivering a cooling medium alternately in horizontally opposed directions to each of the cooling medium paths 10. The cooling medium delivery device 11 further includes a cooling medium compression transport device 14 such as a blower fan for delivering a cooling medium to the cooling medium introduction ducts 12a and 12b.

According to the above-described structure, the cooling medium is made to flow through the cooling medium paths 10 from both horizontal directions of the battery pack 1 to effectively cool each of the rechargeable batteries 2. Moreover, since the cooling medium delivery device 11 is provided neither above nor below the battery pack 1, a height of the battery pack 1 including the cooling device is reduced.

When the cooling medium compression transport device 14 is operated, the cooling medium is delivered alternately in both horizontal directions through the cooling medium introduction ducts 12a and 12b to each of the cooling medium paths 10 of the battery pack 1.

The cooling medium flows in the directions opposed to each other along both the side walls 7 of each of the rechargeable batteries 2, as indicated with arrows in a solid line and a dot line in FIG. 3. Thus, even if a temperature is elevated while the cooling medium is flowing through the cooling medium paths 10 to lower the cooling capacity, the cooling capacity is averaged between both the side walls 7 in each of the rechargeable batteries 2. Thereby, the rechargeable batteries 2 are uniformly cooled over their overall length in a horizontal direction.

In this manner, according to the cooling device for the battery pack 1 of this embodiment, a space where the battery pack 1 is placed is ensured without any difficulty. In addition, the individual rechargeable battery 2 is efficiently and uniformly cooled to prevent a decrease in a battery output, charging/discharging efficiency, and battery service life.

In the embodiment shown in FIG. 1, the cooling medium exhausted from the cooling medium paths 10 is released to the peripheral space. In a case where any inconvenience occurs if the cooling medium having an increased temperature is released to the periphery, it is suitable to provide air exhausting paths 15 between the delivery ports 13. Each of the air exhausting paths 15 exhausts the cooling medium exhausted from each of the cooling medium paths 10 from an opening 16 which is provided on the side opposite to the delivery port 13. It is also suitable to provide air exhausting ducts 17, each including connection ports 18 connected to the respective openings 16.

The cooling medium exhausted from each of the cooling medium paths 10 is exhausted to a desired portion through the air exhausting ducts 17, so that the exhausted cooling medium is prevented from being diffused to the periphery, and there will be no possibility that the exhausted cooling medium might have an adverse influence.

Second Embodiment

Figure 5:
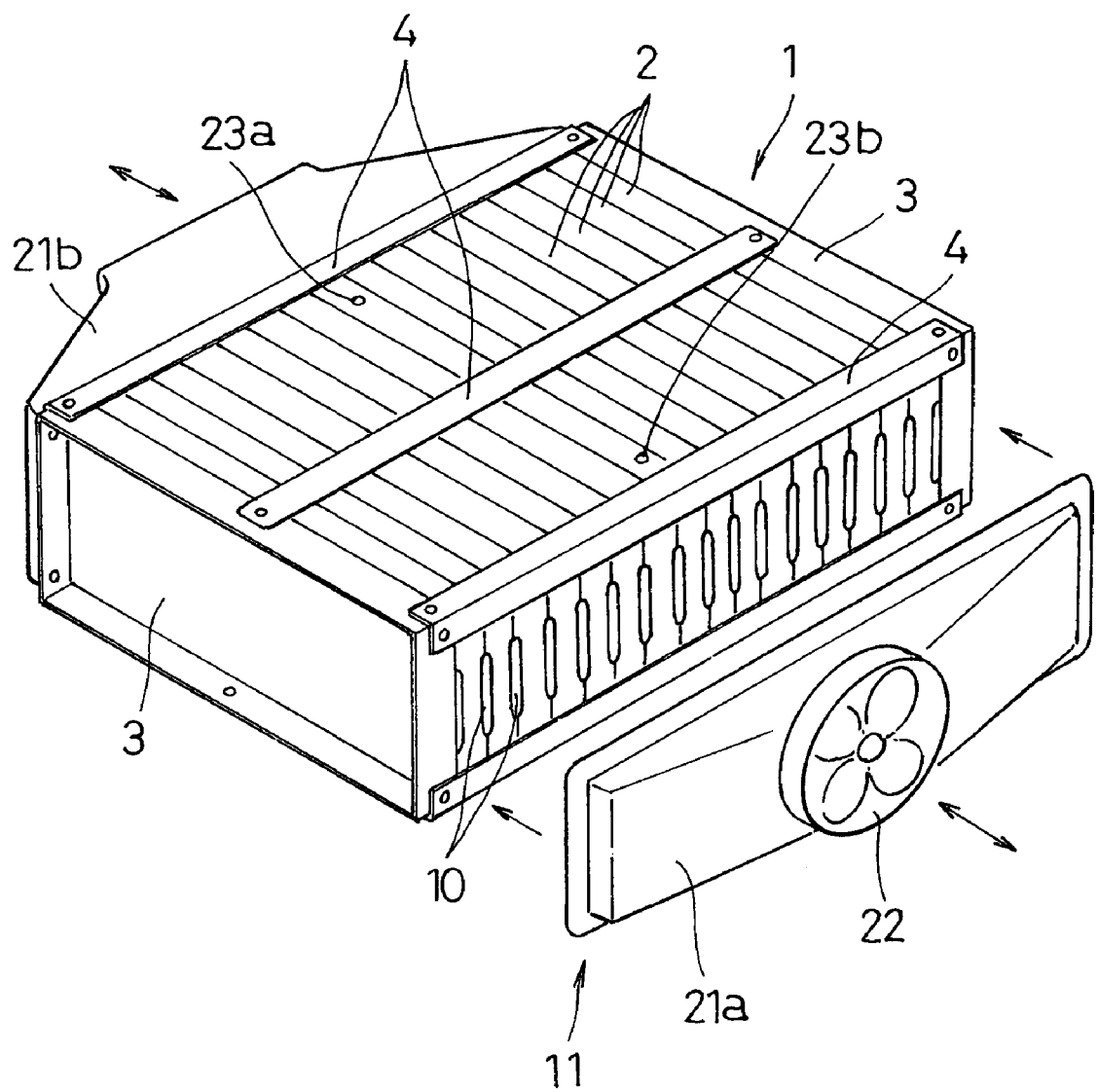
FIG. 5 is a partially exploded perspective view showing a schematic configuration of a cooling device for a battery pack according to a second embodiment of the invention.

Next, a second embodiment of the cooling device for the battery pack according to the present invention will be described with reference to FIG. 5.

In the first embodiment, the cooling medium is delivered alternately in horizontally opposed directions to each of the cooling medium paths 10 between the rechargeable batteries 2. In this embodiment, the cooling medium is delivered from either of the horizontal directions (that is, from right or left) of the battery pack 1. When a difference in temperature is found to be a predetermined value or larger through detection of both right and left ends of the rechargeable battery 2, a delivery direction of the cooling medium is switched, thereby uniformly cooling each of the rechargeable batteries 2.

The cooling medium delivery device 11 of this embodiment includes a pair of cooling medium delivery hoods 21a and 21b on both sides of the battery pack 1 so as to deliver the cooling medium from either right or left direction to each of the cooling medium paths 10 of the battery pack 1. A cooling medium compression transport device 22 such as a blower fan, capable of reversal switching a compression transport direction of the cooling medium, is connected to one cooling medium delivery hood 21a. Temperature detection members 23a and 23b are provided in the vicinities of both horizontal ends of an arbitrary rechargeable battery 2. Detection signals from the temperature detection members 23a and 23b are input to a control section (not shown). When a difference in temperature of, for example, about 2 to 3 degrees, is generated between the detected temperatures, the compression transport direction of the cooling medium is switched.

According to the above-described structure, the cooling medium compression transport device 22 is operated to allow the cooling medium to flow from one cooling medium delivery hood 21a through each of the cooling medium paths 10 to the other cooling medium delivery hood 21b so as to cool each of the rechargeable batteries 2. When it is detected that a difference in temperature on both ends of the rechargeable batteries 2 becomes a predetermined value or higher, a compression transport direction of the cooling medium compression transport device 22 is switched to allow the cooling medium to flow from the cooling medium delivery hood 21b through each of the cooling medium paths 10 to the cooling medium delivery hood 21a. By repeating this operation, each of the rechargeable batteries 2 is uniformly cooled over its overall length in a horizontal direction, thereby preventing a decease in a battery output, charging/discharging efficiency, and battery service life.

In the above description of the embodiments, the upper rib 8a and the lower rib 8b are provided on the side wall 7 of the rechargeable battery 2 to form the cooling medium paths 10. However, it is also possible to form the side walls 7 of the rechargeable battery 2 in a planar shape and to interpose a spacer having the cooling medium path 10 between the side walls 7. Alternatively, it is possible to interpose a corrugated panel member between the planar side walls 7 to form the cooling medium path 10 between the side walls 7. In this case, the use of a metal material such as a drawn material made of aluminum or the like as the spacer or the corrugated panel member is suitable because such a material is advantageously light-weighted and inexpensive with a high thermal conductivity to allow the cooling effects owing to heat conduction to be obtained.

Third Embodiment

Next, a third embodiment of the cooling device for the battery pack according to the present invention will be described with reference to FIGS. 6 to 8.

A battery pack 31 in the third embodiment includes a plurality of rechargeable batteries 32 that are arranged in parallel through spacers 34 made of a synthetic resin. Each of the rechargeable batteries 32 includes a plurality of prismatic cells 33, each having a prismatic metal case, which are arranged in a row so as to be connected in series. The spacers 34 form cooling medium paths 35, respectively.

A pair of connection terminals 36 having one polarity are provided on one shorter side face of each of the cells 33, which shorter side face is opposed to the arrangement direction of the cells 33. The connection terminals 36 are provided so as to penetrate through the case in an insulated state. On the other shorter side face of the cell 33, a pair of connection terminals 37 having the other polarity are provided by forming portions of the case in a protruding manner. The pairs of connection terminals 36 and 37 are joined with each other to constitute the rechargeable battery 32. Moreover, connection plates 38, each having a pole 39 at its center, are joined with the respective pairs of connection terminals 36 and 37 of the rechargeable battery 32 so as to connect the rechargeable batteries 32 at the pole 39 to each other through a connection member 40.

The battery pack 31 is housed in a case 41. On one end of the case 41, that is, on one end in the direction in which the cells 33 are arranged, an inlet port 42 for the cooling medium is provided, whereas an outlet port 43 is provided on the other end of the case 41. In the inlet port 42, a cooling medium supplying device 44 such as a fan is provided.

The spacers 34 are formed by providing a plurality of horizontal bars 45 at intervals, each forming the cooling medium path 35 between the rechargeable batteries 32, over the overall length of the rechargeable battery 32 and by connecting the horizontal bars 45 through longitudinal walls 46. At the upper end and the lower end of the spacer 34, engaging flanges 47 for engaging the upper face of the rechargeable battery 32 over its overall length are provided. Moreover, engaging protruding portions 48 for fitting into and being engaged with the outer shorter side faces of the cells 33 on both ends and the gaps between the cells 33 so as to hold each of the cells 33 are provided in the vicinities of the engaging flanges 47 in a continuous manner from the engaging flanges 47.

Figures 7A, 7B, 7C, 7D:
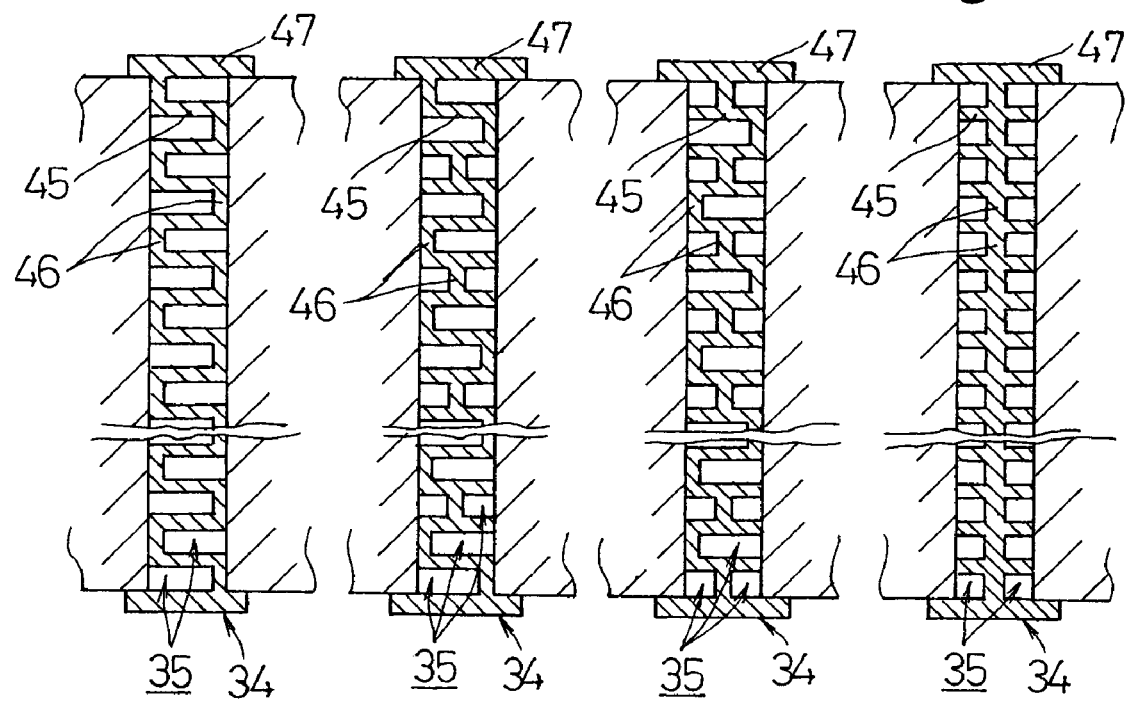
FIGS. 7A to 7D are longitudinal sectional side views respectively viewed along arrows VIIA-VIIA, VIIB-VIIB, VIIC-VIIC and VIID-VIID in FIG. 6.
Figure 8:
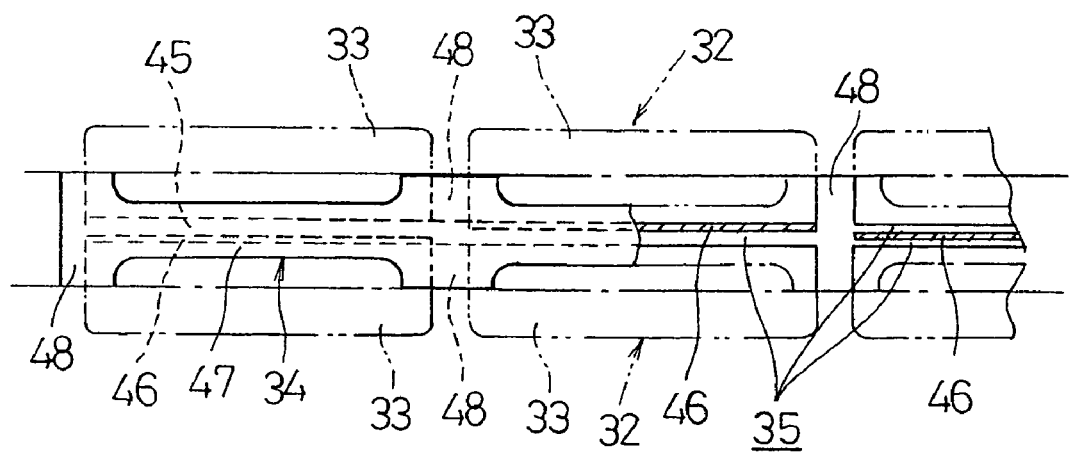
FIG. 8 is a partial sectional plan view showing a spacer in the third embodiment.
Figure 9:
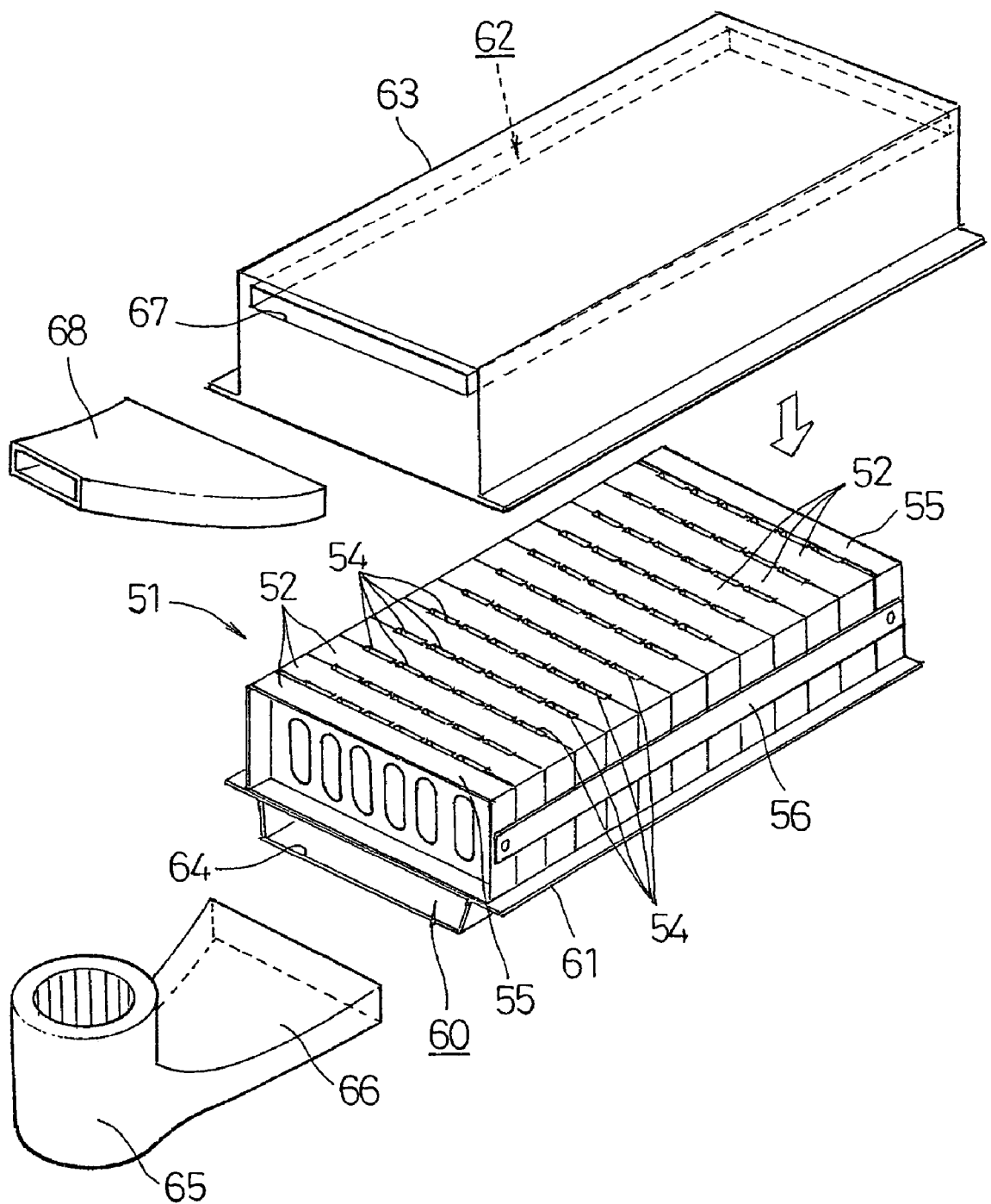
FIG. 9 is an exploded perspective view showing a schematic configuration of a conventional cooling device for a battery pack.
Figure 10:
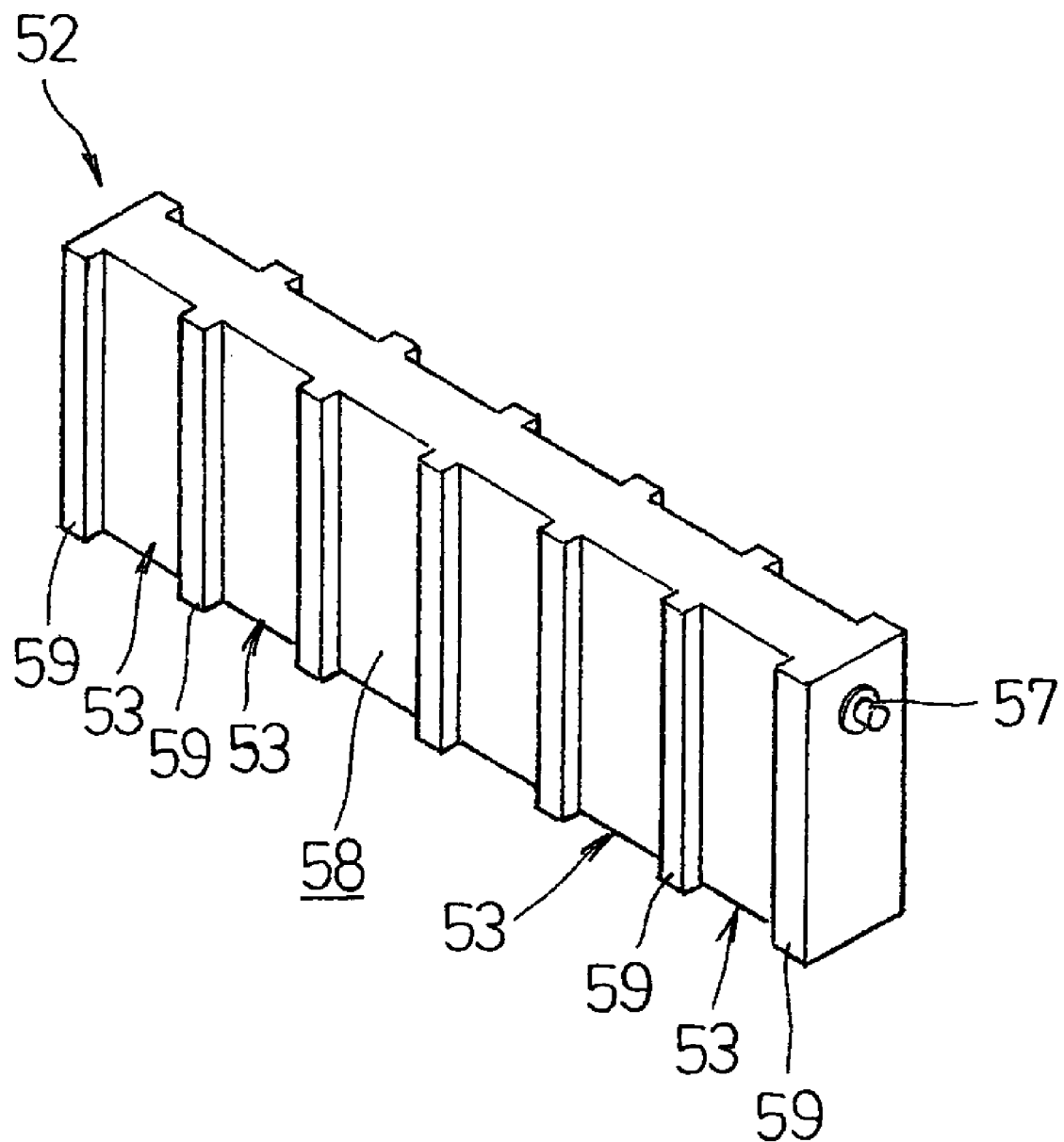
FIG. 10 is a schematic perspective view of a conventional rechargeable battery.

In this spacer 34, the longitudinal wall 46 is provided so as to abut on or be close to the surfaces of the adjacent cells 33 in an alternate manner for the cells 33 on the upstream side of the flow direction of the cooling medium, as shown in FIG. 7A. In this situation, a half of the cooling medium paths 35 face the surfaces of the cells 33. For the next cells 33, as shown in FIG. 7B, three patterns of the longitudinal wall 46 are repeated; that is, the pattern of the longitudinal wall 46 abutting on or being close to one surface of the adjacent cells 33, another pattern abutting on or close to the other surface of the adjacent cells 33, and the other pattern situated in the middle of the cooling medium path 35. In this situation, two-thirds of the cooling medium paths 35 face the surfaces of the cells 33. For the cells 33 in the center, as shown in FIG. 7C, two patterns are repeated; that is, the longitudinal wall 46 abutting on or being close to the surface of either of the adjacent cells 33 in an alternate manner, and the longitudinal wall 46 situated in the middle of the cooling medium path 35. In this situation, three-fourths of the cooling medium paths 35 face the surfaces of the cells 33. For the remaining part, the area of the surfaces of the remaining cells 33 facing the cooling medium paths 35 is sequentially increased in a similar manner. For the cells 33 on a downstream side in a flow direction of the cooling medium, as shown in FIG. 7D, the longitudinal wall 46 is entirely positioned in the middle of the cooling medium path 35, so that the entire cooling medium paths 35 face the surfaces of the cells 33.

As described above, the area of the surfaces of the cells 33 facing the cooling medium paths 35 are sequentially increased from the upstream side to the downstream side of the cooling medium paths 35. The area of the surfaces of the cells 33 facing the cooling medium paths 35 is small on the upstream side where the cooling medium has a low temperature, whereas the area of the surfaces of the cells 33 facing the cooling medium paths 35 is increased on the downstream side where the cooling medium has an elevated temperature. Thereby, each of the cells 33 constituting the rechargeable battery 32 are uniformly cooled to prevent a decrease in a battery output, charging/discharging efficiency and battery service life.

Since the area of the surfaces of the cells 33 facing the cooling medium paths 35 is varied by changing the position of the longitudinal wall 46 in the spacer 34, a simple change in the structure of the spacer 34 allows the above described effects to be obtained. In addition, the rechargeable battery 32 is constituted by the cells 33, each including the metal case, while the spacer 34 is made of an electrically insulating material. Thus, the cooling capacity of the cells 33 is enhanced owing to their metal cases. Simultaneously, the spacers 34 ensure the insulation between the rechargeable batteries 32.

According to the cooling device for the battery pack of the present invention, the cooling medium is allowed to flow through the cooling medium path between the longer side faces of the rechargeable battery, each longer side face having the largest area, from both horizontal directions of the battery pack so as to effectively cool each of the rechargeable batteries. Since the cooling medium delivery device is not required to be provided above and below the battery pack, a height of the battery pack including the cooling device is reduced. A space where the battery pack is to be placed is ensured without any difficulty.

In the cooling device for the battery pack including a plurality of the rechargeable batteries arranged in parallel, the cooling medium delivery device includes a pair of the cooling medium introduction ducts, each having delivery ports for delivering the cooling medium alternately in horizontally opposed directions to each of the cooling medium paths, and the cooling medium compression transport device for supplying the cooling medium to both of the cooling medium introduction ducts. Since the cooling capacity is averaged between both side walls of the rechargeable battery, the rechargeable batteries are uniformly cooled over the overall length in a horizontal direction. Thus, a decrease in a battery output, charging/discharging efficiency, and battery service life are prevented.

In the cooling device for the battery pack including a plurality of prismatic rechargeable batteries arranged in parallel, the cooling medium delivery device includes: a pair of the cooling medium delivery hoods provided on both right and left sides of the battery pack; a cooling medium compression transport device capable of reversal switching a compression transport direction of the cooling medium, connected to at least one of the cooling medium delivery hoods; a temperature detection member for detecting temperatures of the vicinities of both ends in a horizontal direction of an arbitrary rechargeable battery; and a control device for controlling the cooling medium compression transport device to switch the compression transport direction of the cooling medium in accordance with the detected temperatures. With such a structure, when it is detected that a difference in temperature between the ends of the rechargeable battery is a predetermined value or higher, the compression transport direction of the cooling medium is switched. By repeating such an operation, the rechargeable batteries are uniformly cooled over its horizontal overall direction, thereby preventing a decrease in a battery output, charging/discharging efficiency, and battery service life.

In addition, in the battery pack including a plurality of rechargeable batteries arranged in parallel, each rechargeable battery being constituted by arranging and combining a plurality of prismatic cells in a row, the area of the surfaces of the cells facing the cooling medium path is sequentially increased from the upstream side to the downstream side of a flow direction of the cooling medium. Thereby, each of the cells is uniformly cooled to prevent a decrease in a battery output, charging/discharging efficiency, and battery service life.

Moreover, according to the rechargeable battery of the present invention, when the rechargeable batteries are arranged in parallel so that both side walls are opposed to each other, a path having upper and lower closed ends and right and left open ends is formed between both side walls. The cooling medium is allowed to flow through the thus formed path without providing any cooling medium delivery device above or below the rechargeable battery. Accordingly, the rechargeable batteries are effectively cooled in a horizontally compact structure.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A cooling device for a battery pack including a plurality of prismatic rechargeable batteries arranged in parallel so that their longer side faces are opposed to each other, each of the rechargeable batteries having a height larger than a thickness of shorter side surfaces and the longer side faces with a width in a horizontal direction larger than the height, the cooling device comprising:
   a cooling medium path that allows a cooling medium to flow in right and left directions between the longer side faces of the rechargeable batteries; and
   a cooling medium delivery device that delivers the cooling medium to the cooling medium path,
   wherein the cooling medium path is horizontally formed between the longer side faces of the rechargeable batteries so that the cooling medium flows horizontally therethrough, and each rechargeable battery includes a plurality of connection terminals provided on both shorter side surfaces thereof, and an upper rib and lower rib are provided respectively at the upper and lower ends of the longer side faces, the upper rib and the lower rib extend along the entire length of the longer side faces forming the cooling medium path, and wherein the cooling medium path has upper and lower ends closed by the upper rib and the lower rib, and further has open right and left ends.

2. A rechargeable battery comprising an electricity generating element housed in a sealed prismatic battery case,
   wherein an upper rib and a lower rib are provided in a protruding manner at two or four upper and lower positions among four positions at upper ends and lower ends on both side walls of the rechargeable battery so that the upper rib and the lower rib form a cooling medium path having closed upper and lower ends and open left and right ends between the side walls when a plurality of rechargeable batteries are arranged in parallel with their side walls being opposed to each other,
   the cooling medium path is horizontally formed between the side walls of the plurality of rechargeable batteries so that a cooling medium flows horizontally therethrough, and
   the rechargeable battery includes a plurality of connection terminals provided on both shorter side surfaces thereof, and the upper rib and the lower rib provided respectively at the upper and lower ends of the side walls extend along the entire length of the side walls forming the cooling medium path, and the cooling medium path has upper and lower ends closed by the upper rib and the lower rib, and further has open right and left ends.

3. The rechargeable battery according to claim 2, wherein protruding portions preventing the side wall from being outwardly expanded to narrow the path are provided at appropriate intervals between the upper rib and the lower rib.

* * * * *